United States Patent [19]

Griswold

[11] Patent Number: 4,583,246
[45] Date of Patent: Apr. 22, 1986

[54] SCAVENGING APPARATUS FOR LIFE SUPPORT SUIT HELMET

[75] Inventor: Harrison R. Griswold, Simsbury, Conn.

[73] Assignee: United Technologies Corporation, Hartford, Conn.

[21] Appl. No.: 562,792

[22] Filed: Dec. 19, 1983

[51] Int. Cl.⁴ .......................... A61F 5/44; A47B 3/00; A62B 18/04
[52] U.S. Cl. ............................................ 2/2.1 A; 2/6; 2/9; 128/206.22
[58] Field of Search .................... 2/2.1 R, 2.1 A, 6, 9; 128/206.22

[56] References Cited

U.S. PATENT DOCUMENTS

| 2,813,271 | 11/1957 | Finken | 2/6 |
| 2,970,593 | 2/1961 | Seeler | 2/6 X |
| 3,473,165 | 10/1969 | Gran et al. | 2/6 |
| 3,550,588 | 12/1970 | Stahl | 128/206.22 X |
| 3,603,313 | 9/1971 | Arblaster | 128/206.22 X |
| 4,274,759 | 6/1981 | Long et al. | 405/186 |

Primary Examiner—Louis K. Rimrodt
Attorney, Agent, or Firm—John Swiatocha

[57] ABSTRACT

An apparatus for scavenging vomitus from the interior of the helmet of a life support suit comprises a normally furled mask (10) defined by a sidewall structure (20) connecting to a suction conduit (90). The mask is expanded into registry with the mouth of the user by inflation of bellows (40) located within the sidewall structure. Suction applied to the interior of the mask positively traps vomitus on a liquid absorbent filter (85).

11 Claims, 5 Drawing Figures

SCAVENGING APPARATUS FOR LIFE SUPPORT SUIT HELMET

DESCRIPTION

1. Technical Field

This invention relates generally to a scavenging apparatus for the helmet of a life support suit such as is worn by astronauts in the exploration of outer space and more particularly to such apparatus for the controlled containment of vomitus within the helmet.

2. Background Art

In the exploration of outer space, particularly in a zero gravity environment, it is not uncommon for astronauts to experience motion sickness symptoms of nausea and vomiting. Although the symptoms generally subside after several days, upcoming space exploration missions are expected to last only a few days each, and therefore, this motion sickness problem will, in all probability, be of concern for at least the next several years.

The problem of nausea and vomiting is particularly serious when experienced by one during extravehicular activity while wearing a life support suit including a pressurized, flexible garment, a pressurized helmet and a life support backpack carrying oxygen supply and cooling systems for the suit. It will be readily appreciated that without proper scavenging of vomitus from the interior of such a suit, motion sickness experienced during extravehicular activity could result in abortion of such activity and conceivably, risk the safety of the individual involved.

While at first, vomitus scavenging may be thought to be readily accomplishable in any number of ways, ideally, for reasons of economy, such scavenging should be achievable without redesign of existing life support suits. Any means for scavenging vomitus should not contribute significantly to normal maintenance required by the life support suit and backpack; should be economical, easy to operate, and energy efficient. Scavenging apparatus should be reuseable, reliable, safe and comfortable, and perhaps most importantly, should provide a positive containment of vomitus therewithin to minimize the risks of reingestion and fouling of the life support suit's ventilation system.

U.S. Pat. No. 3,473,165 discloses a venting device through which vomitus may be purged from a life support suit helmet. To the extent that the apparatus of the present invention does not require the user's hands for operation and may be utilized with existing life support suit helmets, the apparatus of the present invention represents an improvement over that disclosed in this patent.

DISCLOSURE OF INVENTION

It is therefore an object of the present invention to provide an improved scavenging apparatus for the helmet of a life support suit.

It is another object of the present invention to provide such an apparatus which positively contains vomitus therewithin.

It is another object of the present invention to provide such an apparatus which may be used with current life support suit helmets without redesign thereof.

It is another object of the present invention to provide such an apparatus characterized by an economy of structure and ease of maintenance.

It is another object of the present invention to provide such an apparatus characterized by an ease of operation.

It is another object of the present invention to provide such an apparatus which is easily maintainable and energy efficient.

It is another object of the present invention to provide such an apparatus which is reliable, safe and comfortable for the user.

In accordance with the present invention, the scavenging apparatus comprises a normally contracted mask adapted for wear proximally to the chin of the user within a life support suit of existing design. The mask is expanded by inflation thereof into registry with the mouth of the user and includes a reservoir for the containment of vomitus therewithin. A conduit communicating with the mask's interior applies suction thereto for positive containment of vomitus within the reservoir. A filter disposed interiorly of the reservoir prevents the vomitus from clogging the suction conduit. In the preferred embodiment, the mask is inflated by admission of gas, preferably oxygen, from a small cylinder thereof to the interior of a plurality of inflatable chambers provided within a sidewall structure of the mask. When deflated, the mask is contracted into a furled condition by a plurality of springs or elastic bands also provided within the sidewall of the mask. The expandability of the mask by inflation and the furled, contracted configuration render the mask compact in both extended and contracted conditions, enabling the mask to be conveniently employed within current life support suit helmets without any redesign thereof and worn without obstructing the user's vision. The reservoir of air for inflation of the mask may be provided within the mask interior and operated by handles extending from the reservoir to an area adjacent the mouth of the user for hands-free operation of the mask by the user's mouth.

BEST MODE FOR CARRYING OUT THE INVENTION AND INDUSTRIAL APPLICABILITY THEREOF

Figure 1:
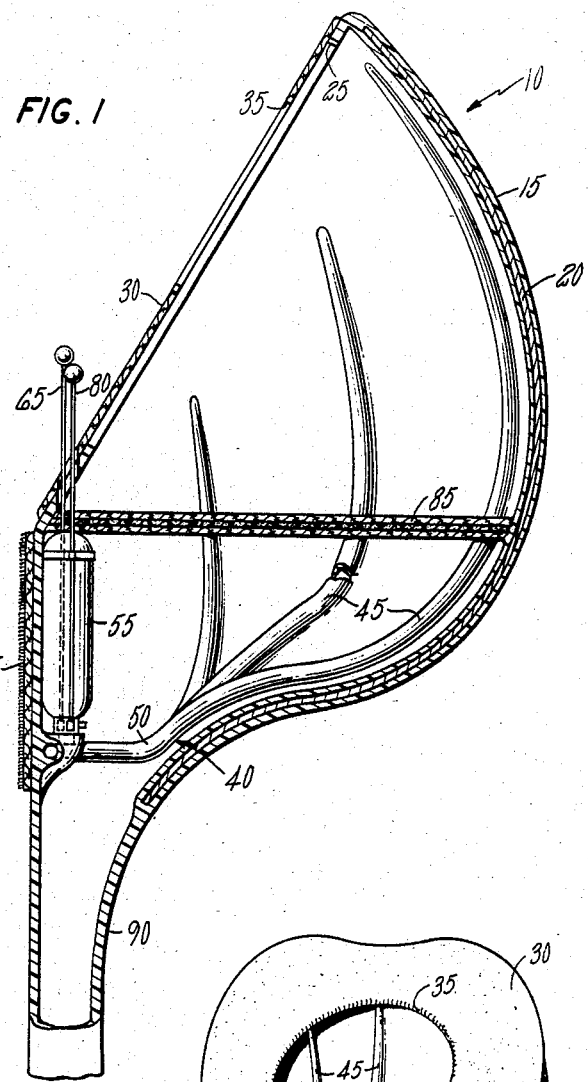
FIG. 1 is a sectioned elevation of the scavenging apparatus of the present invention.
Figure 2:
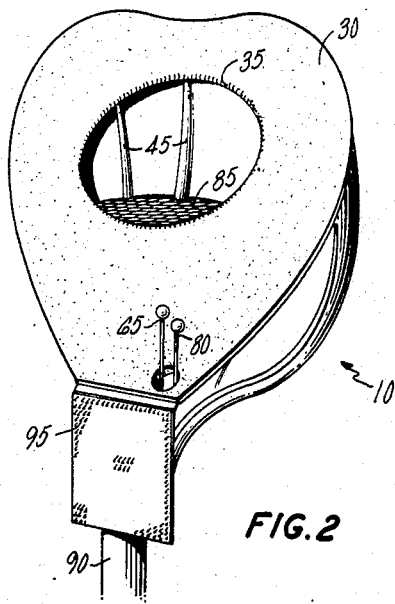
FIG. 2 is a perspective view of the scavenging apparatus of the present invention.
Figure 3:
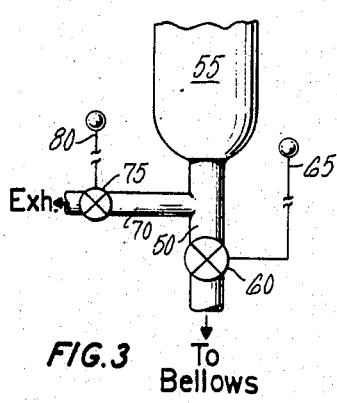
FIG. 3 is a schematic representation of an air supply system for inflation of the apparatus.

Referring to the drawing and particularly to FIGS. 1 and 3 thereof, the scavenging apparatus of the present invention comprises a flexible mask 10 including a truncated, bulb-shaped sidewall structure 15 of a suitable material such as a vinyl polymer or rubberized cloth. Sidewall structure 15 is provided with resilient springs 20 laminated therein, springs 20 being formed from such materials as elastic bands or spring steel wires and having a propensity toward coiling in a clockwise (as viewed in FIG. 1) helical direction for furling the mask into a contracted configuration. The sidewall structure also includes a mouth opening 25 surrounded by a flexible covering 30 of terry or similar material having a relatively coarse but soft hand, covering 30 contacting the face of the user when the apparatus is expanded in use. Covering 30 includes an aperture 35 which provides an inlet through which vomitus is expelled from the mouth of the user to the interior of mask. The coarse hand of covering 30 enhances the comfort of the mask, allowing the user to relieve lower facial itching by rubbing against the covering.

The mask is also provided at the inner surface of the sidewall structure thereof with a bellows 40 comprising a plurality of hollow, resilient, inflatible chambers 45 formed from any material such as synthetic rubber which is impervious to the fluid with which the bellows is inflated. The bellows may be formed integrally with the sidewall structure or attached thereto by such techniques as adhesive bonding or the like and connect to a manifold portion 50 which communicates with a pressurized cylinder 55 containing the fluid (such as gaseous oxygen) with which the bellows are inflated. A valve 60 (FIG. 3), disposed in manifold 50 and operated by handle 65 extending to an area proximal to the mouth of the user controls the admission of the fluid into the bellows from the cylinder. An exhaust conduit 70 (FIG. 3), communicating with manifold 50 is provided with an exhaust valve 75 therein, valve 75 being operated by a handle 80 which, like handle 65, extends to an area proximal to the mouth of the user and is operated thereby for exhausting fluid from the bellows to collapse the mask. As best seen in FIG. 1, the manifold, the pressurized cartridge and the inlet and exhaust valves are disposed within the mask at a lower portion thereof, the valve handles extending upwardly through the edge of the sidewall structure which defines mouth 25 and through the overlying portion of flexible cover 30.

A liquid absorbent filter 85 comprising a plurality of layers of such material as cotton gauze or the like extends across the mask, being attached therearound by stitching or the like. The filter, the sidewall structure thereabove and flexible covering 30, define a reservoir for the positive containment of vomitus therewithin. The orientation of the filter relative to the pressurized cartridge and valves minimizes the fouling of these components by vomitus expelled in the reservoir.

Sidewall structure 20 terminates in a conduit 90 which communicates with the interior of the reservoir through filter 85. Suction applied to the reservoir through conduit 90 and filter 85 positively traps any vomitus solids on the filter thereby minimizing the risk of accidental fouling of the life support suit ventilation system or inhalation by the user. The opposite end of conduit 90 (not shown) may be connected through any portion of the life support suit to ambient (zero air pressure in outer space) to provide the suction noted herein. Alternatively the conduit may be connected to the return of the life support suit's ventilation system also providing a net airflow away from the interior of the mask to positively trap vomitus solids on the filter. The liquid portion of the vomitus is absorbed by the filter.

A fastening means such as a sheet of miniature hook fasteners 95 may be provided at the juncture of sidewall structure 20 and conduit 90 for fastening the mask to a garment such as a liquid cooled ventilation garment normally worn by the user.

Figure 4:
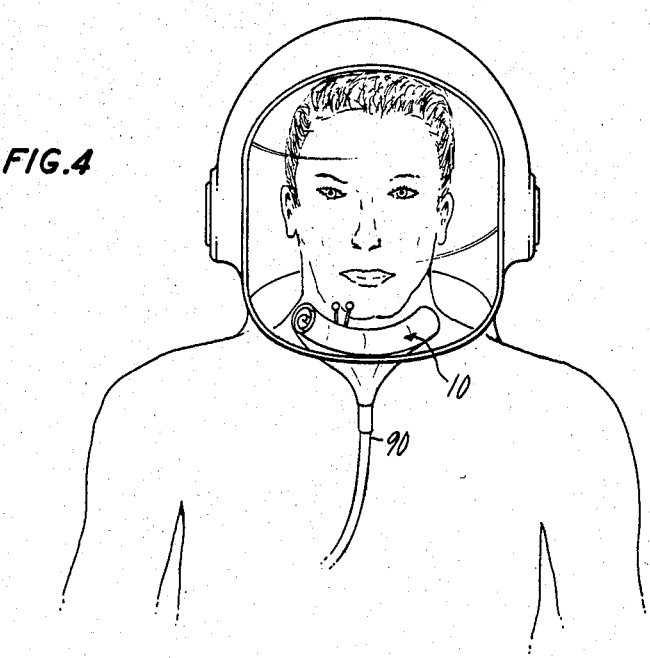
FIG. 4 is a frontal view of the apparatus in a retracted condition as worn by a user thereof.
Figure 5:
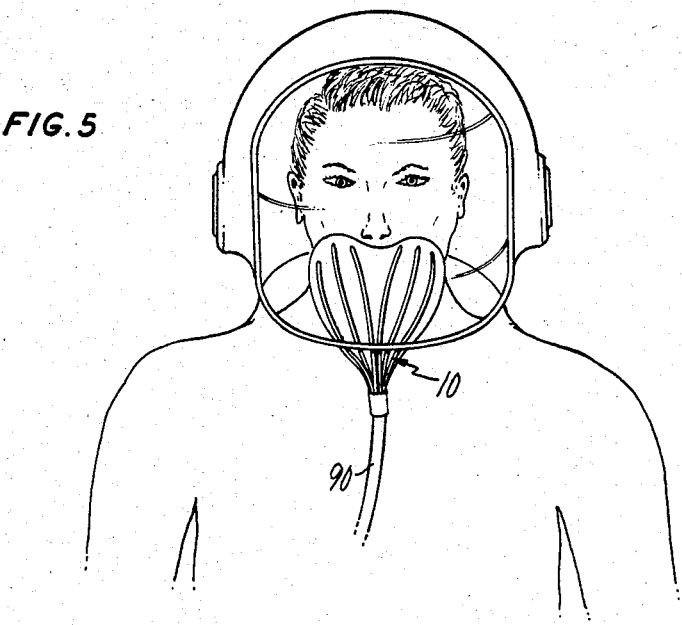
FIG. 5 is a frontal view similar to FIG. 4, but with the apparatus shown in an expanded (inflated) condition.

Referring to FIGS. 4 and 5, operation of the mask is as follows. Referring specifically to FIG. 4, before the bellows are inflated, springs 20 maintain the mask in a defurled (contracted) condition beneath the chin of the user. When the user feels a need for the mask, inlet valve 60 is opened by the user's mouth thereby inflating the bellows and expanding the mask into registry with the user's mouth. The vomitus expelled by the user into aperture 35 is captured on filter 85, the filter absorbing the liquid portion of the vomitus. The mask may then be refurled into the orientation shown in FIG. 4 by opening valve 75 with the user's mouth.

It will be appreciated that the suction and filter arrangement of the scavenging apparatus of the present invention effectively and positively contains vomitus within the mask. The compactness of the mask in both expanded and contracted conditions allows the mask to be used interiorly of current life support suit helmets without any redesign thereof. The minimal number of component parts involved renders the mask economical to manufacture. The miniature gas cartridge and mouth operated valves allow hands-free use of the apparatus. The mask is reusable simply by cleaning the interior thereof and/or replacing the filter, periodically recharging cylinder 55 and, due to the simple construction thereof and the materials employed therein, is reliable, safe and comfortable.

While a particular embodiment of the scavenging apparatus of the present invention has been shown, it will be appreciated that from the disclosure herein, various modifications will suggest themselves to those skilled in the art. For example, various mechanisms such as hand operated, pressure sensitive switches or electric solenoids may be employed to actuate the bellows inflation/deflation valves. Furthermore, while specific materials have been described, alternate equivalent materials may be used without departing from this invention. Thus, while oxygen has been described as a suitable fluid for inflating the bellows, it will be appreciated that such other fluids as water and various other gases may be employed with equal utility. Accordingly, it is intended by the following claims to cover these and all other such modifications which fall within the true spirit and scope of this invention.

Having thus described the invention, what is claimed is:

1. Scavenging apparatus for the controlled containment of vomitus within the helmet of a life support suit, said apparatus being characterized by:
   a normally contracted mask adapted for wear proximally to the chin of the user, said mask being expandable by inflation into registry with the mouth of the user and provided with a reservoir for the containment of said vomitus therewithin.
   a conduit in fluid communication at an end thereof with the interior of said reservoir for applying suction thereto to minimize the risk of escape of said vomitus from said reservoir; and
   a filter disposed in said reservoir for trapping said vomitus thereon to prevent fouling of said conduit by said vomitus.

2. The apparatus of claim 1 characterized by said mask being provided in the walls thereof with a bellows defined by a plurality of inflatable chambers, the inflation of said chambers expanding said mask into said registry with the mouth of said user.

3. The apparatus of claim 1 characterized by said mask being provided with resilient means which maintain said mask in said contracted condition when deflated, the elasticity of said resilient means being overcome by said inflation of said mask, to maintain said mask in said registry with the mouth of the user.

4. The apparatus of claim 3 characterized by said mask comprising a sidewall structure, said resilient means being embedded therein.

5. The apparatus of claim 3 characterized by said mask being contracted in a furled condition.

6. The apparatus of claim 1 characterized by at least a portion of said filter comprising a liquid-absorbent material.

7. The apparatus of claim 1 characterized by said mask including a reservoir of fluid therewithin and comprising a sidewall structure including a plurality of inflatable chambers disposed thereat, said fluid reservoir being disposed in select fluid communication with said chambers for the inflation thereof and the expansion of said mask into said registry with the mouth of said user.

8. The apparatus of claim 7 characterized by valve means providing said select communication between said fluid reservoir and said inflatable chambers.

9. The apparatus of claim 7 characterized by said valve means including a handle carried by said mask so as to be reachable and operable by the mouth of the user for hands-free operation of said valve means by said mouth of said user.

10. The apparatus of claim 1 characterized by said mask comprising a sidewall structure having a mouth opening at one end thereof, said mouth opening being partially sealed by a flexible covering having an aperture therein registrable with the mouth of said user, said aperture providing an inlet for said vomitus into said reservoir.

11. The apparatus of claim 10 characterized by said flexible covering having a coarse hand for enhancing the comfort of wear of said mask by said user.

* * * * *